(12) United States Patent
WeiLoon et al.

(10) Patent No.: US 7,365,457 B2
(45) Date of Patent: Apr. 29, 2008

(54) MOTOR HOUSING FOR SMALL FORM FACTOR DRIVES

(75) Inventors: Ng WeiLoon, Singapore (SG); Pohlye Lim, Singapore (SG); Mo Xu, Singapore (SG); KL Gan, Singapore (SG); Chang James, Singapore (SG)

(73) Assignee: Seagate Technology, LLC, Scotts Valley, CA (US)

( * ) Notice: Subject to any disclaimer, the term of this patent is extended or adjusted under 35 U.S.C. 154(b) by 164 days.

(21) Appl. No.: 11/224,434

(22) Filed: Sep. 12, 2005

(65) Prior Publication Data

US 2007/0057585 A1   Mar. 15, 2007

(51) Int. Cl.
*H02K 11/00*   (2006.01)
(52) U.S. Cl. ............................... 310/68 R; 310/DIG. 6
(58) Field of Classification Search ............... 310/68 R
See application file for complete search history.

(56) References Cited

U.S. PATENT DOCUMENTS

| | | | |
|---|---|---|---|
| 5,256,922 A * | 10/1993 | Tanaka et al. | 310/71 |
| 5,541,787 A * | 7/1996 | Jabbari et al. | 360/97.01 |
| 5,774,974 A * | 7/1998 | Dunfield et al. | 29/596 |
| 5,815,345 A | 9/1998 | Pelstring et al. | 360/99.08 |
| 6,545,379 B2 * | 4/2003 | Gomyo | 310/68 R |
| 6,728,063 B1 | 4/2004 | Gustafson et al. | 360/99.08 |
| 6,806,601 B2 | 10/2004 | Miyamoto | 310/68 |

\* cited by examiner

*Primary Examiner*—Burton Mullins
(74) *Attorney, Agent, or Firm*—Westman, Champlin & Kelly, P.A.; Leanne Taveggia Farrell

(57) ABSTRACT

The present invention is a motor housing. The motor housing includes a centrally located rotor. The motor housing includes a stator having a plurality of stator teeth and a plurality of stator slots radially and symmetrically arranged about the rotor. Each stator tooth is spaced apart from each other by one of the stator slots. The motor housing also includes at least one printed circuit component deposited in at least one stator slot.

19 Claims, 6 Drawing Sheets

MOTOR HOUSING FOR SMALL FORM FACTOR DRIVES

FIELD OF THE INVENTION

The present invention relates generally to data storage systems. In particular, but not by limitation, the present invention relates to a motor housing for a data storage system.

BACKGROUND OF THE INVENTION

A typical disc drive includes a rigid housing having a basedeck and top cover that encloses a variety of components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective aerodynamic bearing disc head sliders. The sliders carry transducers, which write information to and read information from the data surfaces of the discs.

The components also include an actuator mechanism that moves the sliders across the data surfaces of the discs. The actuator mechanism includes a motor, such as a voice coil motor (VCM), a track accessing arm and suspensions that support the sliders. The motor is operated so as to move the actuator mechanism about an actuator pivot center such that the sliders move from track-to-track across the data surface of a disc.

Often, a printed circuit board (PCB) is mounted directly to a surface of the disc drive and supports a plurality of printed circuit board components. The plurality of printed circuit board components are configured to couple to components enclosed in the disc drive housing for operation. For example, the spindle motor housed in the disc drive is connected to components on the PCB.

Recently there has been an increase in the production of smaller and lighter weight disc drives in the disc drive industry. To design small form factor disc drives, the size of the PCB must also decrease. One option for designing smaller sized PCBs is to shrink the size of the components that are mounted to the board. However, many PCB components need to have large physical sizes to meet operational standards for components housed in the disc drive and are therefore difficult or impossible to shrink. Attempting to shrink PCB components will sacrifice operative standards. Another option for designing smaller sized PCBs is to reduce the amount of space reserved for the spindle motor. Decreasing the space available for the spindle motor results in the selection of a smaller sized spindle motor to be used in the disc drive. However, small sized spindle motors degrade spindle motor performance. Motor performance is an important requirement in small form factor drives.

Embodiments of the present invention provide solutions to these and other problems, and offer other advantages over the prior art.

SUMMARY OF THE INVENTION

The present invention includes a motor housing. The motor housing includes a centrally located rotor. The motor housing includes a stator having a plurality of stator teeth and a plurality of stator slots radially and symmetrically arranged about the rotor, each of the stator teeth are spaced apart from each other by one of the stator slots. The motor housing also includes at least one printed circuit component deposited in at least one of the stator slots.

The present invention further includes a method of reducing the amount of space needed on a printed circuit. The method includes providing a motor. The motor includes a centrally located rotor, a stator having a plurality of stator teeth and a plurality of stator slots radially and symmetrically arranged about the rotor, each stator tooth spaced apart from each other by one of the stator slots. The method also includes depositing at least one printed circuit component in at one of the stator teeth.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
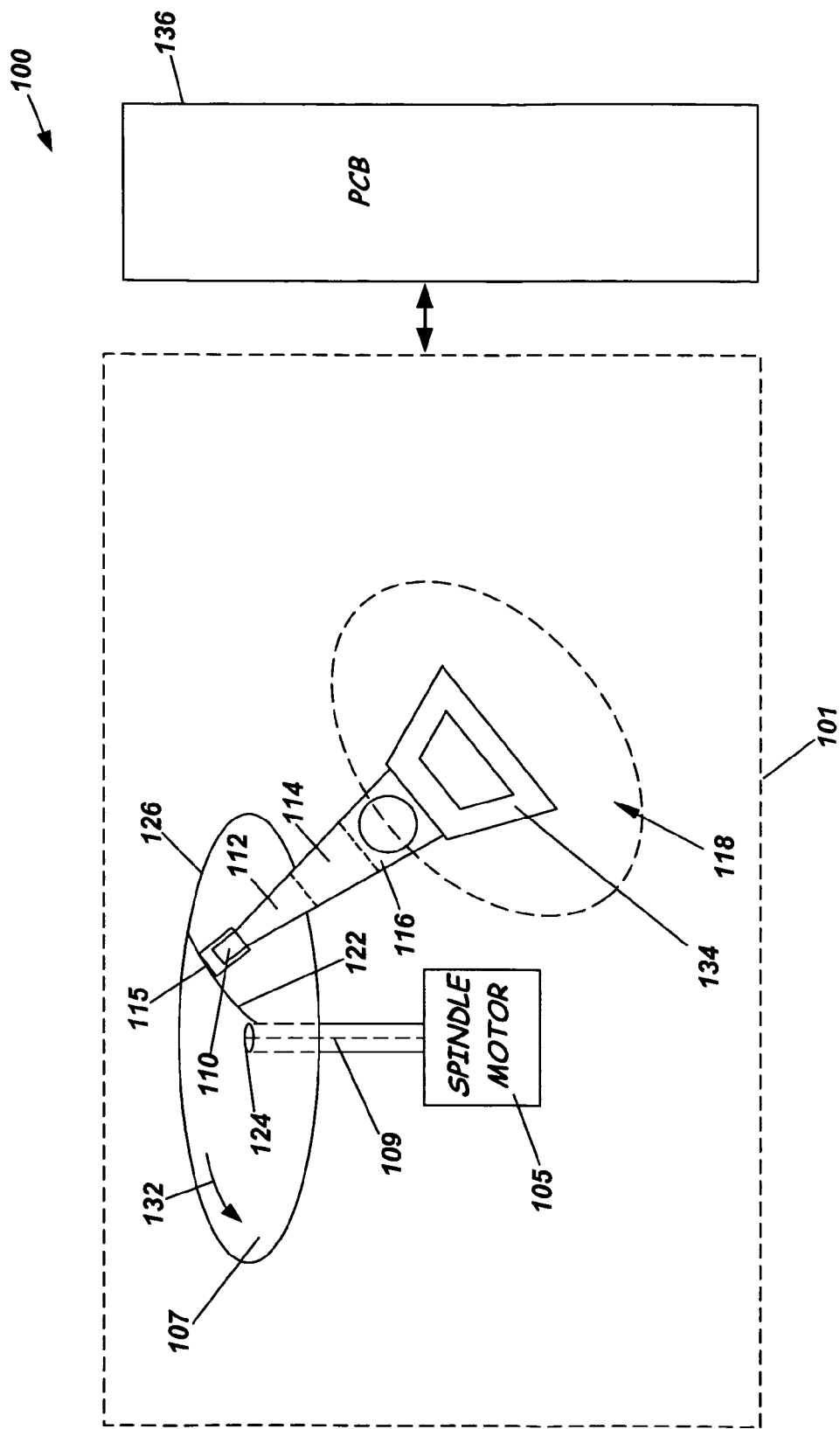
FIG. 1 illustrates a simplified schematic diagram of a data storage system.

FIG. 1 is a simplified schematic diagram of a data storage system 100 in which embodiments of the present invention are useful. Disc drives are common types of data storage systems. Disc drive 100 includes an enclosure 101. Disc drive 100 further includes a disc 107. Those skilled in the art should recognize that disc drive 100 can contain a single disc, as illustrated in FIG. 1, or multiple discs included in a disc pack. As illustrated in FIG. 1, disc 107 is mounted on a spindle motor 105 for rotation about central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1 illustrates one manner of actuating a data head proximate a data storage medium, the present invention, however, is applicable to data storage systems that use other techniques.

Data storage system 100 also includes a printed circuit board (PCB) 136. PCB 136 is located outside enclosure 101. In general, PCB 136 is mounted to an outer surface of enclosure 101. PCB 136 supports a plurality of printed circuit components (not shown in FIG. 1). The printed circuit components are configured to couple to components enclosed within enclosure 101, such as spindle motor 105, slider 110, actuator mechanism 116 and voice coil motor 118. Although disc drive 100 includes PCB 136 for supporting a plurality of printed circuit components, other ways of supporting printed circuit components are possible. For example, circuit components can be adhered together for support instead of being mounted to a PCB for support.

Figure 2:
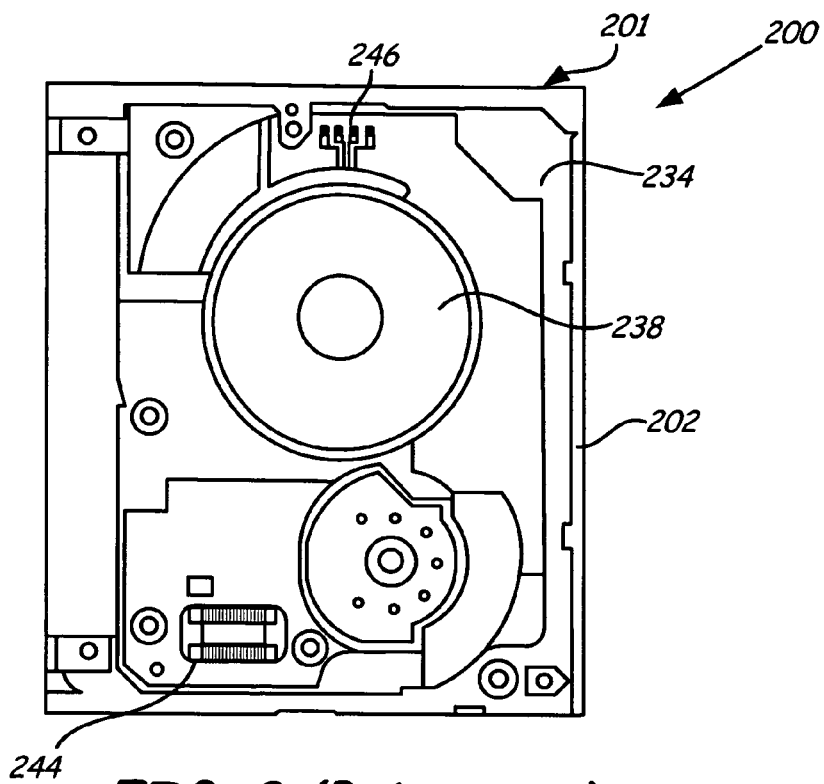
FIG. 2 illustrates a bottom plan view of an enclosure of a data storage system in accordance with the prior art.

FIG. 2 illustrates a bottom plan view of an enclosure 201 of a data storage system 200 in accordance with the prior art. Enclosure 201 includes a basedeck 202 for housing a data storage medium or disc. Basedeck 202 also includes a motor housing 238 that houses a spindle motor. The spindle motor is configured to rotate the data storage disc. Although not illustrated in FIG. 2, the bottom of enclosure 201 is configured to receive a PCB. A PCB includes a plurality of printed circuit components configured to couple to components housed in enclosure 201 through electrical connector 244. Connector pads 246 are configured to couple to the PCB for ultimate connection of a spindle motor housed in motor housing 238 to the PCB.

Figure 3:
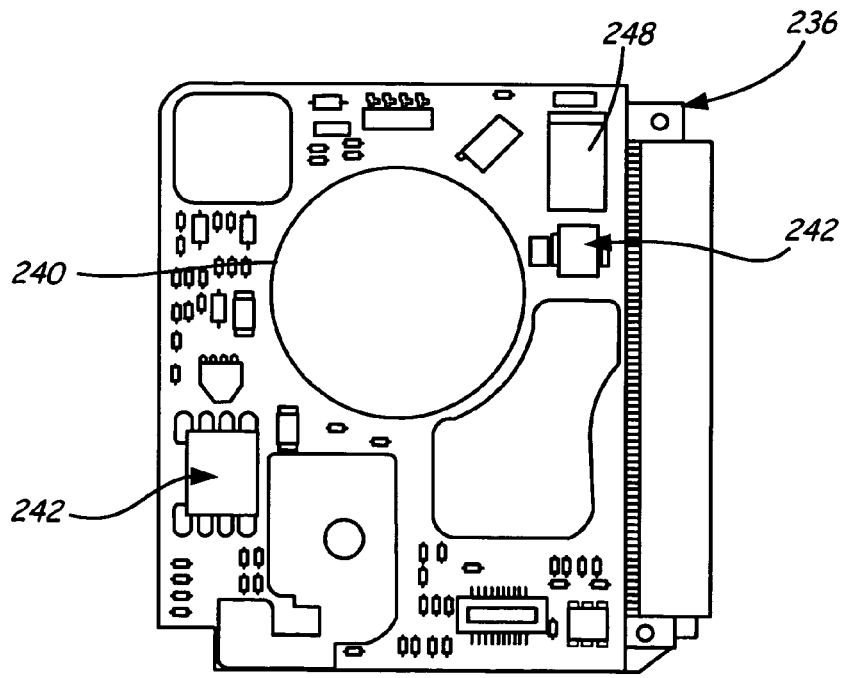
FIG. 3 illustrates a top plan view of a printed circuit board in accordance with the prior art.

FIG. 3 illustrates a top plan view of a PCB 236 in accordance with the prior art. The top of PCB 236 is configured for attachment to the bottom of basedeck 202 (FIG. 2). PCB 236 includes an opening 240. Opening 240 is sized to accommodate motor housing 238 (FIG. 2). PCB also includes a plurality of printed circuit components 242. Printed circuit components 242 are configured for coupling with components housed within enclosure 201 (FIG. 2) through electrical connector 244 illustrated in FIG. 2. There are many different types of printed circuit components 242 located on PCB 236. In one particular example, a parking capacitor 248 is a printed circuit component that is supported by PCB 236. Parking capacitor 248 stores energy during a drive operation and provides energy through electrical connector 244 to an actuator housed in enclosure 201. Parking capacitor 248 is an important printed circuit component because it provides energy to the actuator to actuate a slider supported by a suspension to a parking position on a ramp in the instance where there is a power failure to the drive.

As illustrated many of the printed circuit components 242, for example parking capacitor 248, have rather large sizes that occupy a significant portion of PCB 236. In order to further decrease the size of enclosure 201, the size of PCB 236 must also decrease. However, it is difficult or impossible to shrink the size of printed circuit components 242 without sacrificing their operative capacity. For example, it is difficult or impossible to shrink the size of parking capacitor 248 without sacrificing the amount of energy that the capacitor is able to store.

Figure 4:
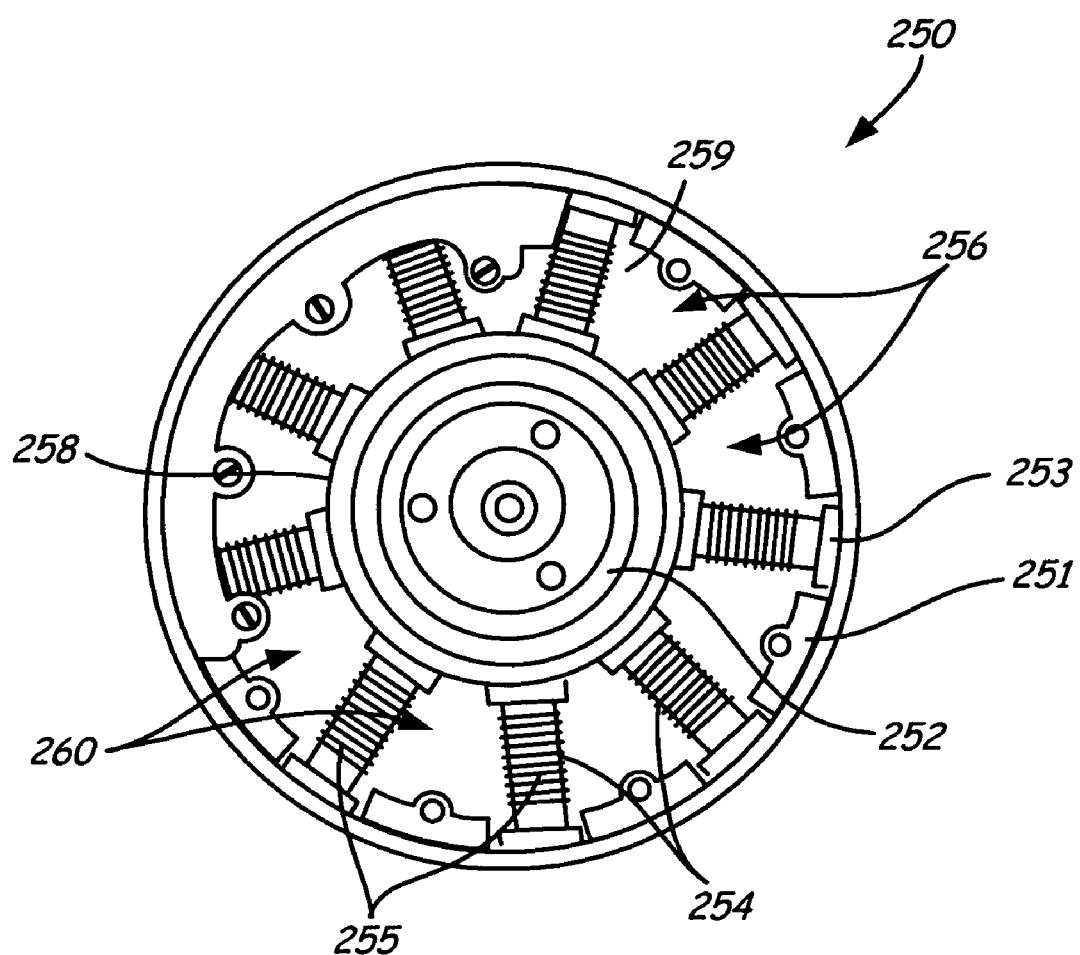
FIG. 4 illustrates a top plan view of a spindle motor in accordance with the prior art.

FIG. 4 illustrates a top plan view of a spindle motor 250 for incorporation into a disc drive in accordance with the prior art. For purposes of clarity in FIG. 4, a motor shield has been removed. Spindle motor 250 includes a centrally located hub or rotor 252, a stator rim 253 spaced apart from and positioned around rotor 252 and a plurality of stator teeth 254 symmetrically spaced apart from each other and radially extending inwardly from the stator rim to rotor 252. Spindle motor 250 also includes a base 256 having an inner surface 259 and an annular magnet 258 positioned around rotor 252. Stator windings 255 are wound around and supported by each stator tooth 254. In operation, stator windings 255 and stator teeth 254 generate a magnetic flux that interacts with annular magnet 258 to thereby operably rotate rotor 252. As illustrated in FIG. 4, spindle motor 250 includes stator slots 260 between each stator tooth 254.

Figure 5:
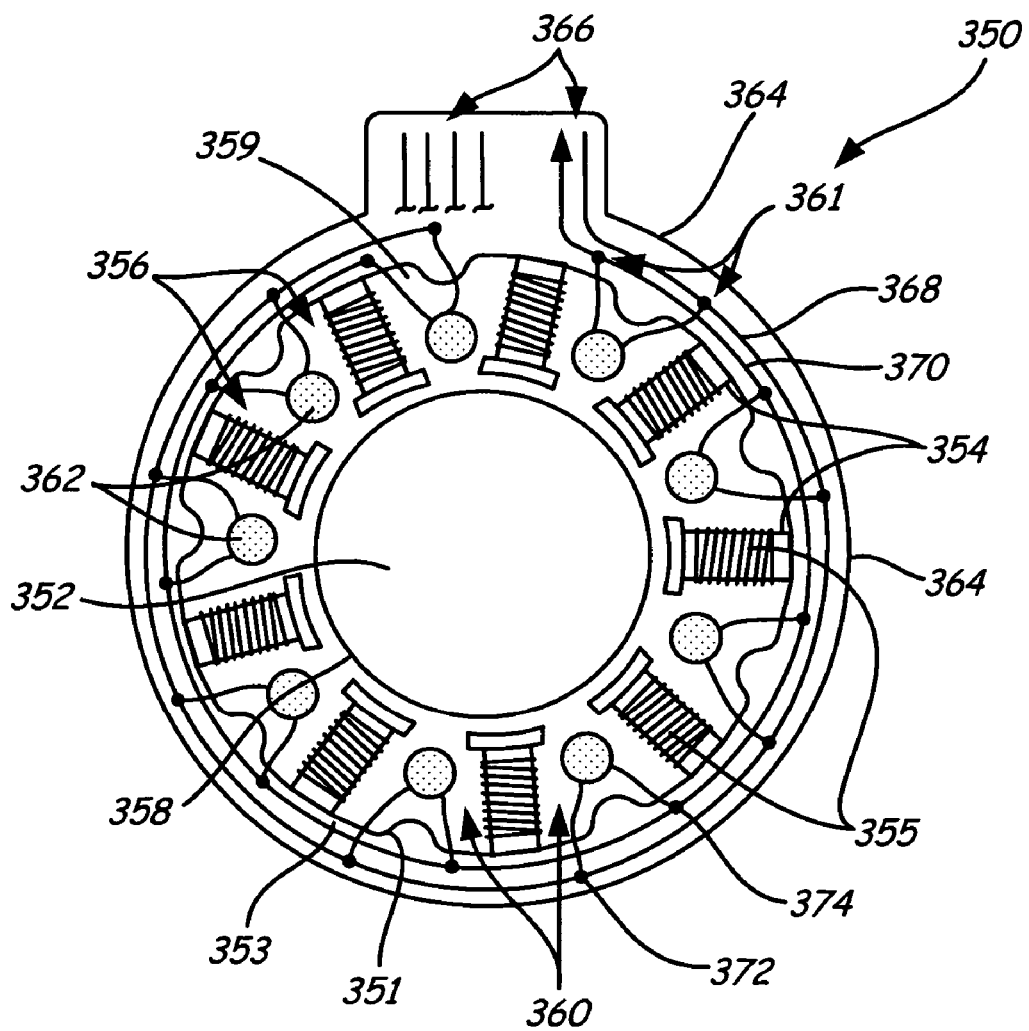
FIG. 5 illustrates a simplified schematic diagram of a spindle motor for incorporation into a disc drive in accordance with an embodiment of the present invention.

FIG. 5 illustrates a schematic diagram of a spindle motor 350 in accordance with an embodiment of the present invention. FIG. 5 schematically illustrates the internal components of a spindle motor as well as schematically represents connections made to a flexible circuit for connection to a PCB. Spindle motor 350 includes a centrally located hub or rotor 352, a stator rim 353 having an inwardly facing surface 351 and a plurality of stator teeth 354 symmetrically arranged about rotor 352 and extending inwardly from stator rim 353 towards the rotor. Spindle motor 350 also includes a base 356 having an inner surface 359 and an annular magnet 358 positioned around rotor 352. Stator windings 355 are wound around and supported by each stator tooth 354. In operation, stator windings 355 and stator teeth 354 generate a magnetic flux that interacts with annular magnet 358 to thereby operably rotate rotor 352.

As illustrated in FIG. 5, spindle motor 350 includes a plurality of stator slots 360. Each slot 360 is located between each stator tooth 354. In accordance with an embodiment of the present invention, spindle motor includes a plurality of printed circuit components 362. Each printed circuit component 362 is deposited in each of the plurality of slots 360. The plurality of printed circuit components 362 are those components that ordinarily are supported on a PCB external to the enclosure of a data storage system. Example components includes discrete components, such as transistors and diodes, as well as passive components, such as resistors, inductors, capacitors and thermistors. Any type of printed circuit component can be deposited in stator slots 360 that includes a dimension not greater than 60 mils in length, 30 mils in width and 30 mils in height. In general, but not by limitation, these printed circuit components are surface model technology (SMT) devices. However, in FIG. 5, the printed circuit components are shown electrically coupled to leads 366 on a flexible circuit 364 for purposes of clarification. Refer to FIG. 6 for a more clear illustration of a printed circuit component that is specifically a SMT device.

By placing printed circuit components 362 in slots 360, motor performance is not sacrificed because the slots are non-useful spaces of motor 350. In one embodiment, and as illustrated in FIG. 5, the plurality of printed circuit components 362 are adhered to base 356 between each stator tooth 354. Although FIG. 5 illustrates a single printed circuit component 362 deposited in each slot 360 between each stator tooth 354, any number of printed circuit components can be deposited in spindle motor 350. In one instance, at least one printed circuit component 362 can be deposited in at least one of the slots 360. In another instance, the number of printed circuit components can be the same as the number of slots 360. In addition, each printed circuit component 362 can be at least a portion of a single printed circuit component that would ordinarily be supported on a PCB. For example, the plurality of printed circuit components 362 could each be portions of a parking capacitor that is ordinarily supported on a PCB in a single component. In FIG. 5, if the plurality of printed circuit components 362 are parking capacitors, the number of parking capacitors deposited in slots 360 depends on the value of capacitance needed for actuator parking, the physical size of each capacitor and the size of space 360. In addition, each parking capacitor can have the same value of capacitance or can have different values of capacitance. For example, a parking capacitor can have a value of capacitance ranging from 0.1 µF to 22 µF.

FIG. 5 also illustrates flexible cable 364 mounted on top of stator rim 353. However, flexible circuit 364 can be mounted to spindle motor 350 in other positions. Flexible cable 364 is configured to facilitate coupling between the stator windings 355 of spindle motor 350 and an electrical connector located on the enclosure of a data storage system (not shown in FIG. 5). As illustrated in FIG. 5, a portion of flexible cable 364 is positioned on and around stator rim 353. Another portion of flex cable 364 extends away from spindle motor 350 ultimately for connection to a PCB.

To couple spindle motor 350 to a PCB, flexible cable 364 includes a plurality of leads 366. The plurality of leads 366 provide coupling of the stator windings to the PCB. In accordance with an embodiment of the present invention, the plurality of leads 366 also provides coupling of the at least one printed circuit component, deposited in at least one of the slots 360, to the PCB. Flexible cable 364 provides two leads 368 and 370 for printed circuit components 362. In this embodiment, each printed circuit component 362, deposited in slots 360, are each coupled to lead 368 and lead 370 at a first point of connection 372 and a second point of connection 374, respectively. In general, the connection points are called trace pads 361 and each trace pad is soldered to each printed circuit component. In FIG. 5, printed circuit components 362 are preferably coupled to leads 368 and 370 in a parallel configuration as illustrated in FIG. 5. Although FIG. 5 illustrates flexible cable 364 as having two leads 368 and 370 for printed circuit components 362, those skilled in the art should recognize that flexible cable 364 can have multiple leads for making multiple connections to printed circuit components. The remaining leads of the plurality of leads 366 are provided for normal function of the spindle motor 350. For example, the remaining leads provide coupling of each phase of the spindle motor as well as a grounding lead.

FIG. 6 illustrates a sectional view of a spindle motor 450 for incorporation into a disc drive in accordance with an embodiment of the present invention. In FIG. 6, the rotor and motor bearing have been removed for purposes of clarity. The spindle motor 450 illustrated in FIG. 6 shows base 456, stator rim 453 and two of the plurality of stator teeth 454 extending inwardly from the stator rim toward a central axis 457 or center point of a rotor if it were shown in FIG. 6. The stator teeth 454 are symmetrically and radially arranged about a central axis 457 and base 456. As illustrated, stator teeth 454 are formed through a process of lamination into a plurality of stacked layers. For example, stator teeth can be made of steel stack layers.

Figure 6A:
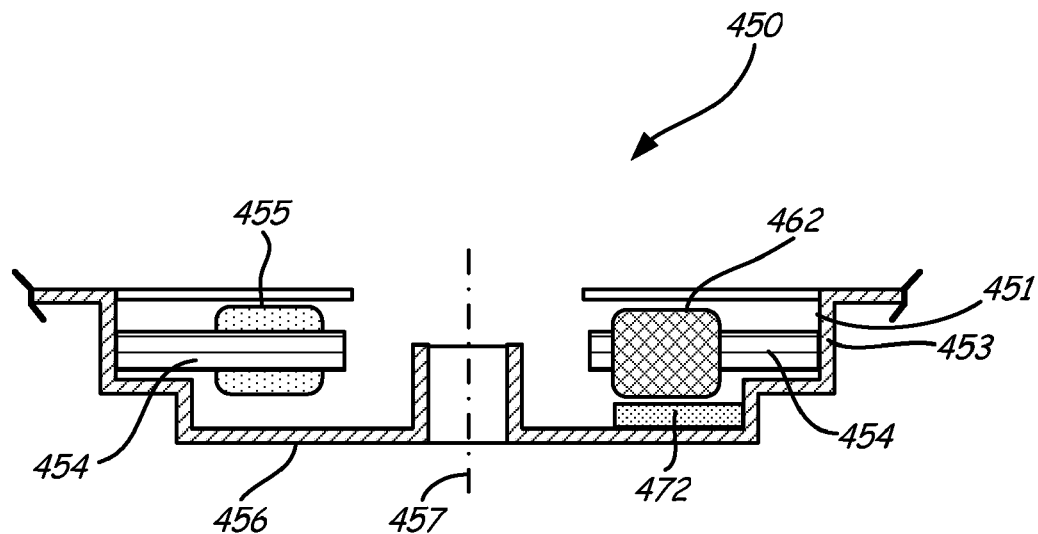
FIGS. 6A and 6B illustrates a-partial sectional views of the spindle motor for incorporation into a disc drive in accordance with embodiments of the present invention.
Figure 6B:
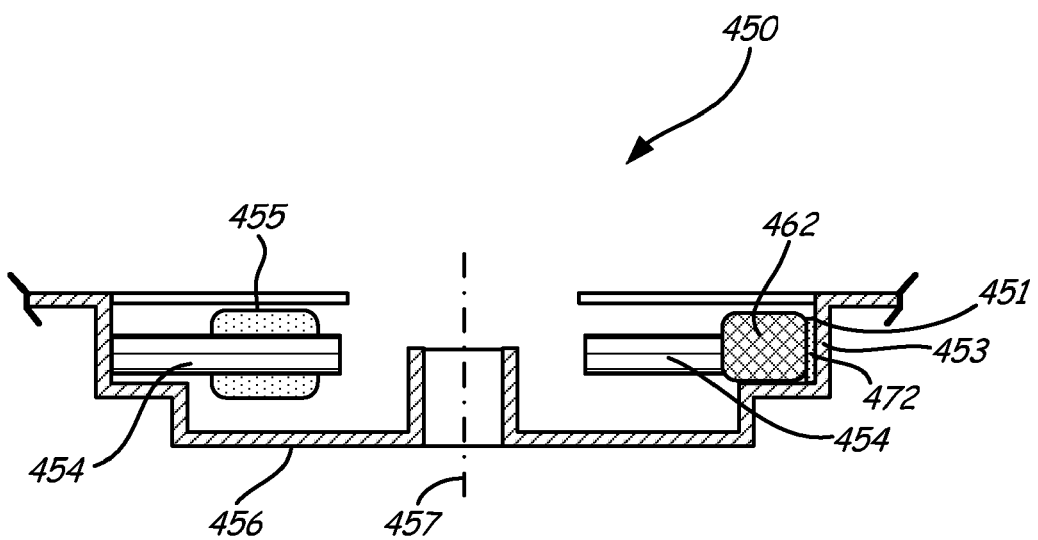

FIG. 6A shows a sectional view of a stator winding 455 that is wound around and supported by stator tooth 454. FIG. 6A also shows a sectional view of a printed circuit component 462 deposited into a slot (see FIG. 5) between two stator teeth 454. In one embodiment, and as illustrated in FIG. 6A the printed circuit component 462 is secured into position by adhering the component to base 456 with an adhesive 472. In another embodiment, FIG. 6B illustrates that the plurality of printed circuit components 462 are adhered to inwardly facing surface 451 of stator rim 453. In either of the above embodiments, each printed circuit component 462 can be adhered using an adhesive, such as an epoxy. However, each printed circuit component 362 can be deposited and secured into each slot 360 using any conventional technique. It should be noted that depositing and securing the plurality of printed circuit components 362 can be accomplished during assembly of spindle motor 350.

Figure 7:
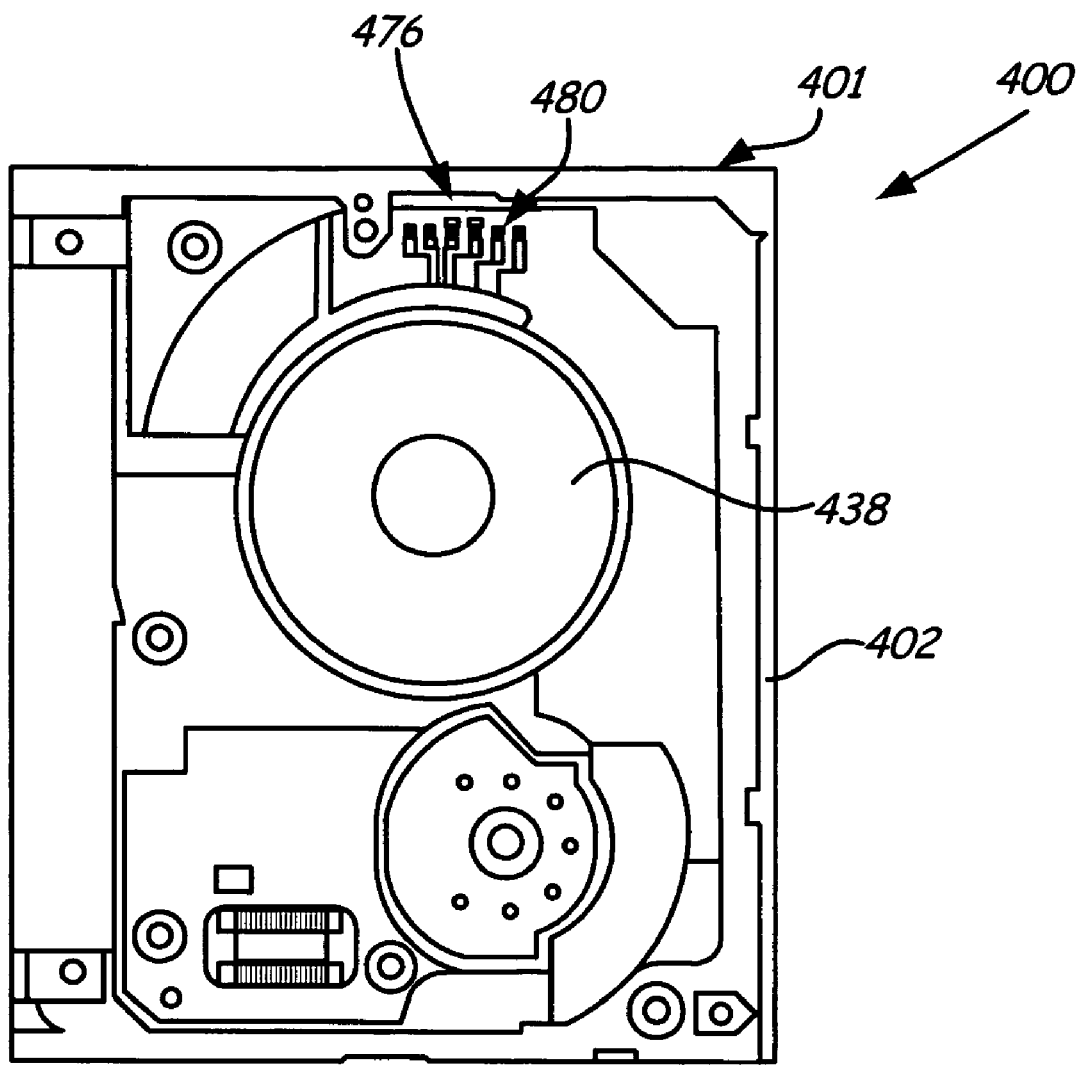
FIG. 7 illustrates a bottom plan view of an enclosure of the data storage system in accordance with an embodiment of the present invention.

FIG. 7 illustrates a bottom plan view of an enclosure 401 of a data storage system 400 in accordance with an embodiment of the present invention. Enclosure 401 includes a basedeck 402. Basedeck 402 includes a motor housing 438 that houses a spindle motor. FIG. 7 also illustrates a plurality of connector pads 476 configured to electrically couple to a corresponding set of pins on an electrical connector located on the PCB. The plurality of connector pads 476 electrically couple the plurality of leads 366 (FIG. 5) on flexible cable 364 (FIG. 5) to a PCB via the set of corresponding pins on the electrical connector. The plurality of connector pads 476 include two connector pads 480 for coupling to leads 368 and 370 (FIG. 5) of spindle motor 350 (FIG. 5) to two corresponding pins on the electrical connector. Leads 368 and 370 are connected to the two pads 480 in a parallel manner. Although FIG. 7 illustrates the plurality of connector pads 476 as having two connector pads 480 reserved for the printed circuit components deposited in the empty space of the spindle motor, those skilled in the art should recognize that the two connector pads 480 can have multiple connector pads to provide for printed circuit components that require multiple connections to multiple leads. The remaining connector pads of the plurality of connector pads 476 and remaining electrical pins are provided for normal function of the spindle motor 350.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a motor housing for a data storage system, it will be appreciated by those skilled in the art that the teachings of the present invention can be applied to other types of enclosure systems, without departing from the scope and spirit of the present invention.

What is claimed is:

1. A motor housing comprising:
   a centrally located rotor;
   a stator having a plurality of stator teeth that support stator coils and a plurality of stator slots radially and symmetrically arranged about the rotor, each of the stator teeth spaced apart from each other by one of the stator slots;
   at least one electrical component selected from the group comprising transistors, diodes, resistors, inductors, capacitors, and thermistors configured for support and use by a printed circuit board located externally to the motor housing, the at least one electrical component deposited in at least one of the stator slots; and
   a coupling mechanism coupling the stator coils and the at least one electrical component to the printed circuit board.

2. The motor housing of claim 1, wherein each electrical component deposited in at least one of the stator slots is electrically connected in parallel to an electrical connector for ultimate coupling to the printed circuit board located externally to the motor housing.

3. The motor housing of claim 1, wherein the at least one electrical component comprises a capacitor configured to store and provide energy to an enclosure system coupled to the motor housing.

4. The motor housing of claim 3, wherein the capacitor comprises a parking capacitor configured to store energy during operation of the enclosure system and provide energy to an actuator in the enclosure system.

5. The motor housing of claim 1, wherein the at least one electrical component is deposited on an inner surface of a base of the motor housing.

6. The motor housing of claim 1, wherein the at least one electrical component is deposited on an inwardly facing surface of the stator.

7. The motor housing of claim 1, wherein the at least one electrical component comprises at least a portion of a component configured for support and use by the printed circuit board located externally to the motor housing.

8. The motor housing of claim 1, wherein the coupling mechanism comprises a flexible cable having a plurality of leads for electrically coupling the motor and the at least one electrical component to a plurality of connector pads.

9. The motor housing of claim 8, wherein the plurality of connector pads are configured to electrically couple to the printed circuit board via a cofresponding set of connector pins on an electrical connector.

10. The motor housing of claim 8, wherein the at least one electrical component is coupled to one of the plurality of leads at a first connection point and is coupled to another one of the plurality of leads at a second connection point.

11. The motor housing of claim 10, wherein the two leads for the at least one electrical component are electrically connected to two of the plurality of connector pads in a parallel manner.

12. The motor housing of claim 1, wherein the at least one electrical component is deposited in the at least one stator slot with an adhesive.

13. The motor housing of claim 12, wherein the adhesive comprises an epoxy.

14. The motor housing of claim 1, further configured for incorporation into a data storage system, the stator and rotor configured to rotate a storage medium.

15. A motor housing comprising:
a motor having a stator including a plurality of stator teeth spaced apart from each other; and
at least one printed circuit component selected from the group comprising transistors, diodes, resistors, inductors, capacitors and thermistors is, deposited between two of the plurality of stator teeth, the at least one printed circuit component deposited on an inwardly facing surface of the stator.

16. The motor housing of claim 15, wherein the at least one printed circuit component is electrically coupled to an electrical connector for ultimate connection to a printed circuit.

17. A motor housing comprising:
a centrally located rotor;
a stator having a plurality of stator teeth that support stator coils and a plurality of stator slots radially and symmetrically affanged about the rotor, each of the stator teeth spaced apart from each other by one of the stator slots;
at least one electrical component configured for support and use by a printed circuit board located externally to the motor housing, the at least one electrical component deposited in at least one of the stator slots; and
a coupling mechanism coupling the stator coils and the at least one electrical component to the printed circuit board, wherein the coupling mechanism comprises a flexible cable having a plurality of leads for electrically coupling the motor and the at least one electrical component to a plurality of connector pads configured to electrically couple to the printed circuit board via a cofresponding set of connector pins on an electrical connector.

18. The motor housing of claim 17, wherein the at least one electrical component comprises a capacitor configured to store and provide energy to an enclosure system coupled to the motor housing.

19. The motor housing of claim 17, wherein each electrical component deposited in at least one of the stator slots is electrically connected in parallel to an electrical connector for ultimate coupling to the printed circuit board located externally to the motor housing.

* * * * *

UNITED STATES PATENT AND TRADEMARK OFFICE
CERTIFICATE OF CORRECTION

PATENT NO. : 7,365,457 B2
APPLICATION NO. : 11/224434
DATED : April 29, 2008
INVENTOR(S) : Ng WeiLoon et al.

It is certified that error appears in the above-identified patent and that said Letters Patent is hereby corrected as shown below:

Column 7, line 19, please delete "coffesponding" and insert --corresponding--.

Column 8, line 27, please delete "coffesponding" and insert --corresponding--.

Signed and Sealed this

Fifteenth Day of July, 2008

JON W. DUDAS
*Director of the United States Patent and Trademark Office*